(12) United States Patent
Forrest et al.

(10) Patent No.: US 12,118,349 B2
(45) Date of Patent: Oct. 15, 2024

(54) SYSTEMS AND METHODS OF CONTEXT-MAPPED CONTAINER DEPLOYMENT FOR CONTROLLED APPLICATION UPDATES

(71) Applicant: salesforce.com, inc., San Francisco, CA (US)

(72) Inventors: Derek Forrest, Burlington, MA (US); Thomas Budich, Jena (DE); Philipp Otto, Jena (DE); Martin Hartmann, Jena (DE); Kevin Fairfax, Burlington, MA (US); Frank Müller, Jena (DE); Eric Liljeback, Burlington, MA (US)

(73) Assignee: Salesforce, Inc., San Francisco, CA (US)

( * ) Notice: Subject to any disclaimer, the term of this patent is extended or adjusted under 35 U.S.C. 154(b) by 237 days.

(21) Appl. No.: 17/389,434

(22) Filed: Jul. 30, 2021

(65) Prior Publication Data

US 2023/0030546 A1 Feb. 2, 2023

(51) Int. Cl.
*G06F 8/71* (2018.01)
*G06F 8/65* (2018.01)
*G06F 11/14* (2006.01)
*G06F 11/30* (2006.01)

(52) U.S. Cl.
CPC ............... *G06F 8/71* (2013.01); *G06F 8/65* (2013.01); *G06F 11/1433* (2013.01); *G06F 11/302* (2013.01)

(58) Field of Classification Search
CPC ............ G06F 8/65; G06F 16/214; G06F 8/71; G06F 11/1433; G06F 11/302
See application file for complete search history.

(56) References Cited

U.S. PATENT DOCUMENTS

| | | | |
|---|---|---|---|
| 2016/0283219 A1* | 9/2016 | Banford | G06F 8/65 |
| 2019/0102162 A1* | 4/2019 | Pitre | H04L 63/104 |
| 2020/0159852 A1* | 5/2020 | Meissner | G06F 8/65 |
| 2020/0241865 A1* | 7/2020 | Phong | G06F 8/71 |
| 2023/0004372 A1* | 1/2023 | Kulakovsky | G06F 8/65 |

* cited by examiner

*Primary Examiner* — S. Sough
*Assistant Examiner* — Cheneca Smith
(74) *Attorney, Agent, or Firm* — Butzel Long

(57) ABSTRACT

Systems and methods are provided for determining, at an operator executed on a server that is separate from an application, whether to perform an update of the application. The operator may perform an upgrade precheck when it is determined that the update to the application is to be performed. The precheck may include determining whether a database migration is to be performed as part of the update to the application, and receiving an update mode and an update type to determine the upgrade to the application. The operator may provide to the application via an application program interface (API), one or more application shutdown configuration parameters for the update based on the received update mode and update type of the upgrade precheck. The operator may deploy the update to the application based on the determined update mode and update type.

20 Claims, 7 Drawing Sheets

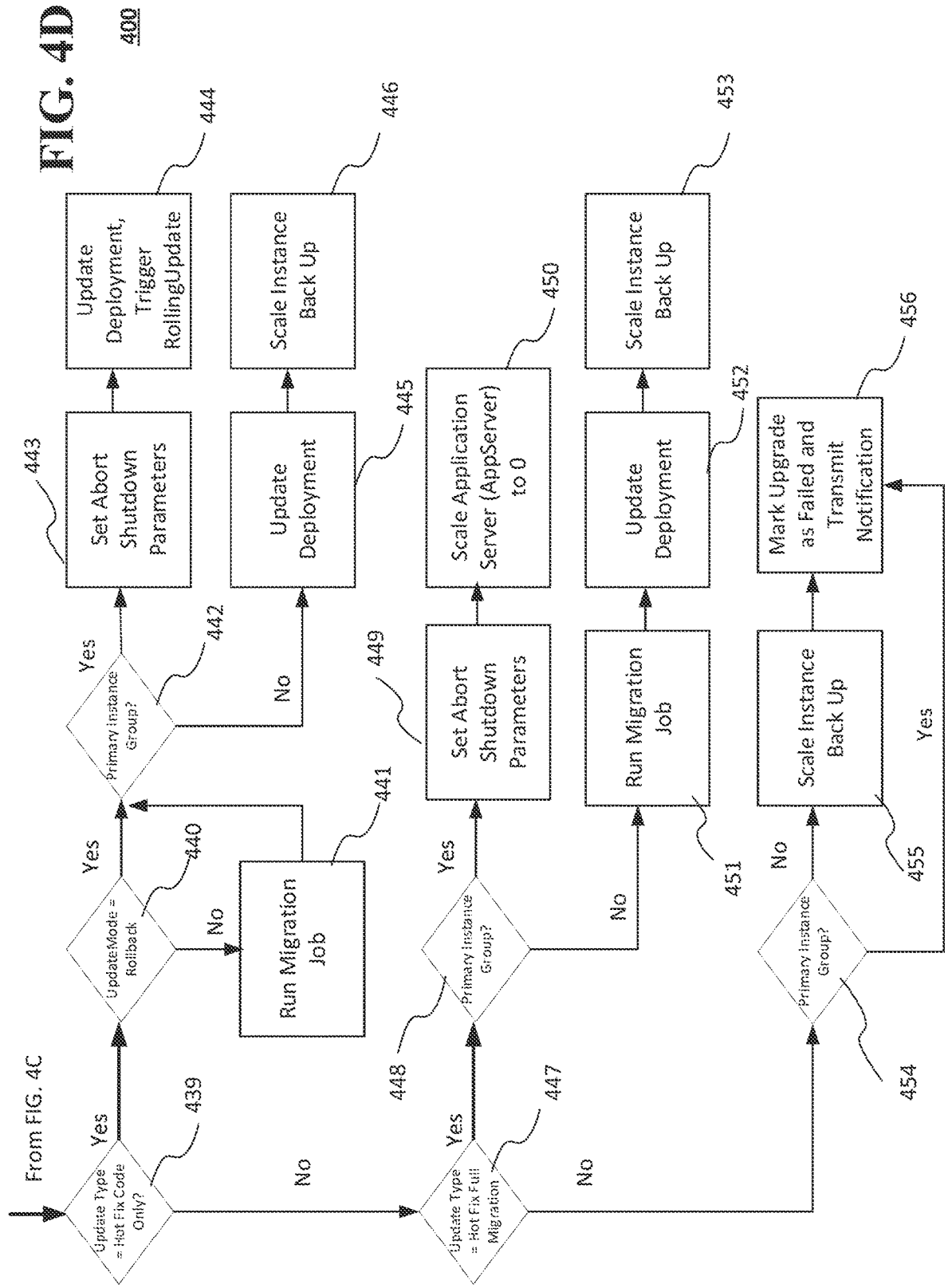

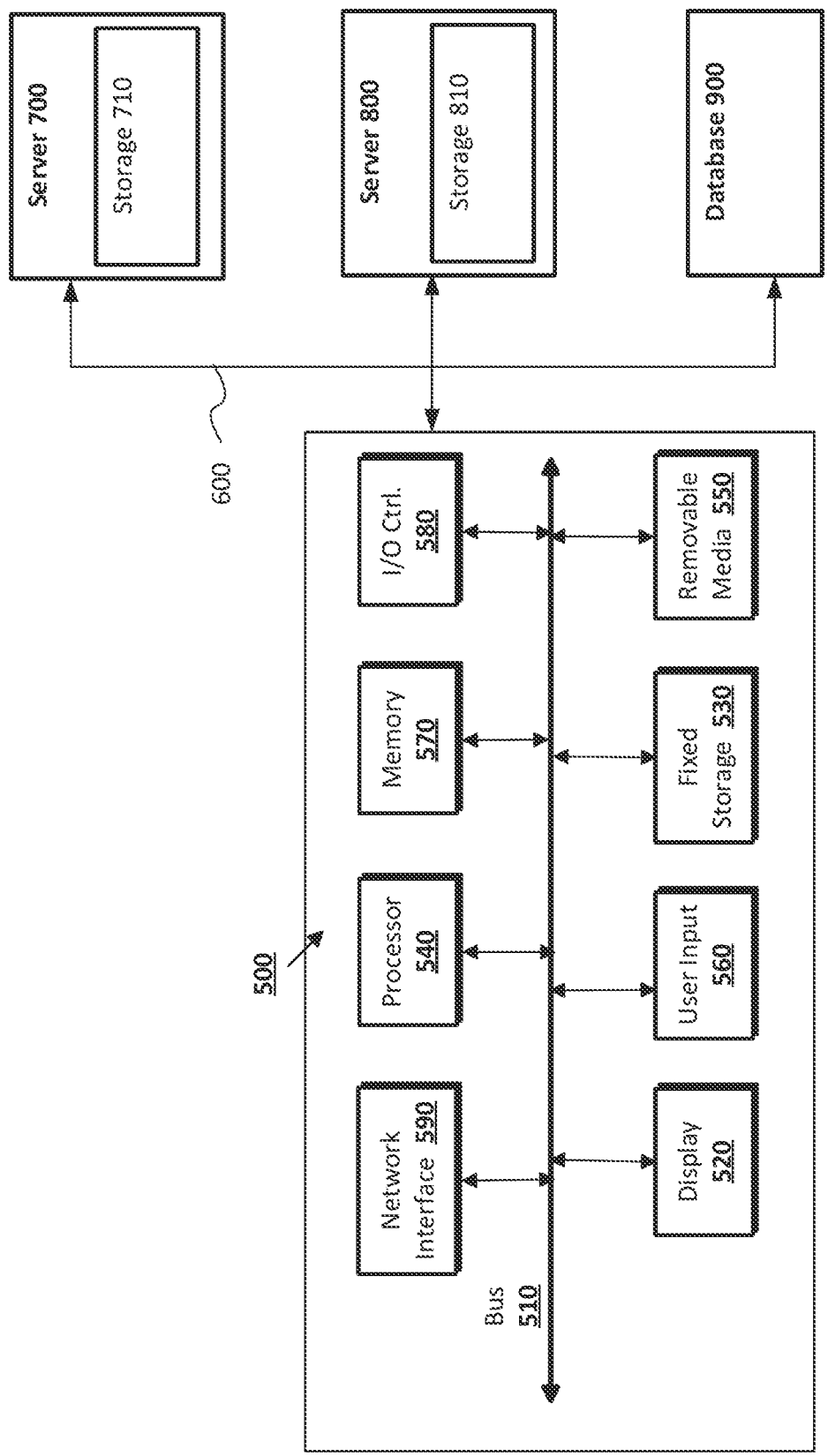

SYSTEMS AND METHODS OF CONTEXT-MAPPED CONTAINER DEPLOYMENT FOR CONTROLLED APPLICATION UPDATES

BACKGROUND

Commerce applications that are configured in a cloud computing architecture are typically complex applications to deploy because of the tight coupling between the application and a database, as well as a supporting jobs framework which runs backend processes. Businesses or other organizations can be negatively impacted when an application, database, or jobs are disrupted. Different types of releases of the application must be orchestrated to reduce the overall impact of deployment of updates to the application.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 4A-4D show example operations in an application update based on different updates modes and update types according to implementations of the disclosed subject matter.

FIG. 5 shows example system according to an implementation of the disclosed subject matter.

DETAILED DESCRIPTION

Figure 1:
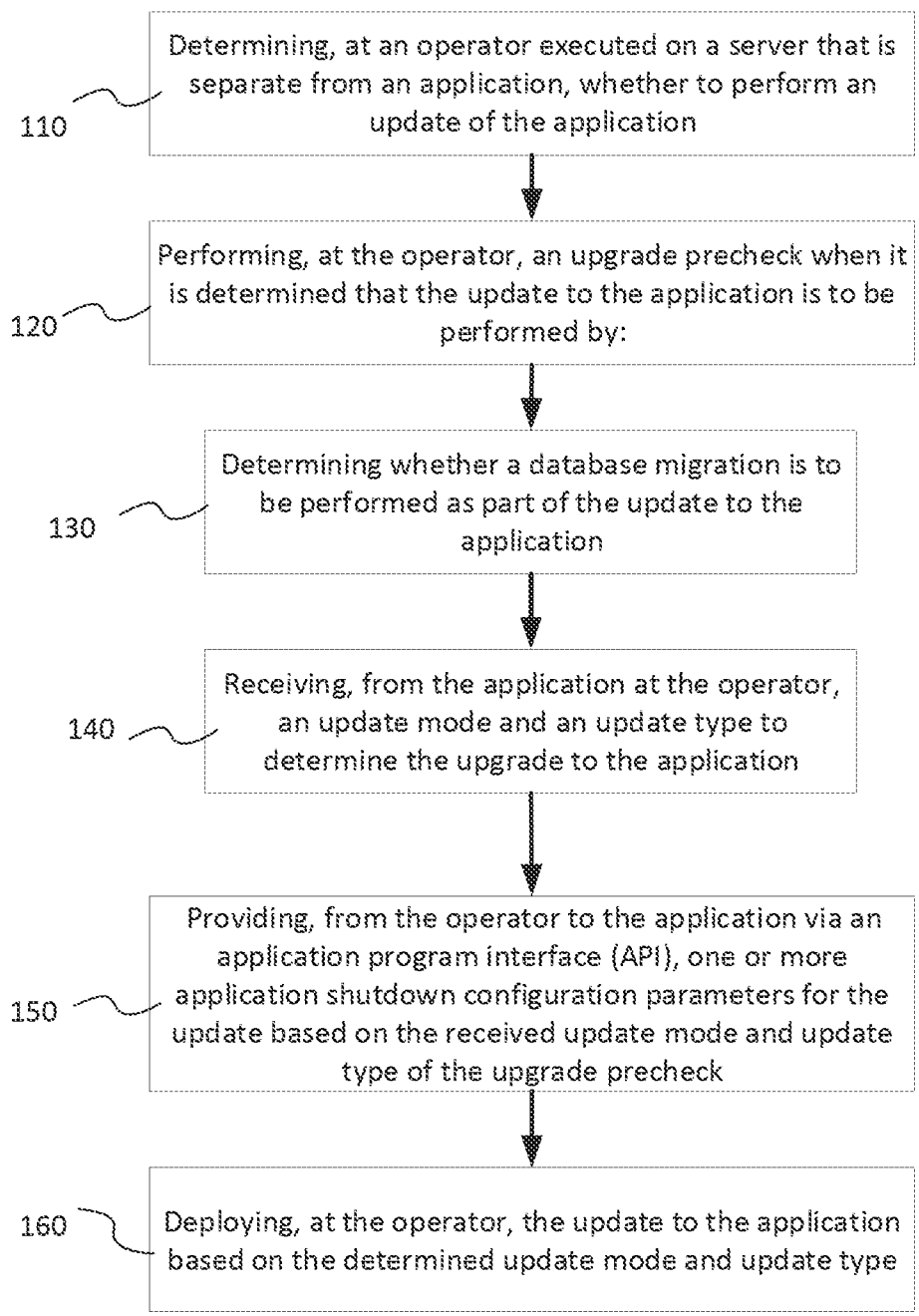
FIGS. 1-3 show example methods of performing an application update according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter may provide systems and methods of deploying application updates in a graceful manner such that backend jobs may be allowed to run through to completion or be paused prior to rolling out the deployment. This may allow deployments of the patch release to be during any time of day. Such deployments may be within a maintenance window, or may be outside of the maintenance window. To determine how to orchestrate deployment of the application update, a precheck may be performed which compares a target version with the current version to determine a type of upgrade to do. The precheck may determine an update mode an and update type from the application, which may be used to determine how the update to the application is to be deployed.

Implementations of the disclosed subject matter may include a shutdown application program interface (API), which may allow for the passage of configuration information to instruct the application how to shut down as part of the upgrade process. An operator may query the application as to how it should update, and may orchestrate the update of the application based on the parameters provided by the application. Some implementations may allow for pausing jobs during release deployment, and resuming jobs after the deployment is complete. That is, jobs may be paused, the upgrade may be performed, and the jobs may be resumed upon completion of the upgrade. The application may have a plurality of pods/containers, all of which may be shut down independently. The shutdown may be synchronized across nodes.

In current systems, application deployment updates are typically handled using container orchestration deployment. Such standard container deployment of updates for applications can disrupt the operation of a business and/or organization. For example, storefront commerce operations, database operations, and the like can be disrupted when an application is deployed and/or updated using the typical container orchestration deployment. In Kubernetes, a container is configured to shut down or upgraded in a static way. That is, the deployment of application upgrades in Kubernetes are not dynamic. In Kubernetes, operators cannot request that an application make conditional stops and/or shutdowns based on the type of update to the application to be made.

In contrast to traditional Kubernetes deployments, implementations of the disclosed subject matter provide for dynamic upgrades of application where the upgrade is based on information provided by the application. Operators of the disclosed subject matter may request that an application make conditional stops and/or shutdowns based on the type of update to the application to be made. The disclosed subject matter may deploy application updates in a graceful manner, so that backend jobs may be allowed to run through to completion or may be paused prior to rolling out the deployment. The disclosed subject matter may control the updates to an application to minimize disruption to users, databases, jobs, and commerce provided by the application. By managing the release of the application, the overall impact of deployment of updates to the application may be reduced.

Generally, customers and/or users may accept disruption for major update releases or rollbacks of an application. For example, such major release updates may include DDL (data definition language) and/or DML (data manipulation language) changes. In view of the DDL and/or DML changes, a database migration may be performed as part of a major release update. For all other releases, customers and/or users typically anticipate that storefronts of the application and/or access to the instance of the application may not be interrupted.

In implementations of the disclosed subjection matter, patch releases for the application may be rolled out in a graceful manner such that backend jobs of the application may be allowed to run through to completion, or such jobs may be paused prior to rolling out the deployment of the patch release. This may allow deployments of the patch release to be during any time of day. Such deployments may be within a maintenance window, or may be outside of the maintenance window. With such deployments, the jobs of the application may not be impacted. Other types of update releases may abort running jobs. In some implementations, jobs may be paused, the upgrade to the application may be performed, and the paused jobs may be resumed upon completion of the upgrade.

An example deployment of the update that may be performed using the operations shown in FIGS. 1-3 and described below is shown below in Table 1, which is divided in half to differentiate release updates (i.e., new application updates) from rollback releases (i.e., returning the application to a previous version). Table 1 shows examples for which update releases and rollback types may disrupt storefronts and/or jobs of the application. The release types may include, for example, a major migration release, a minor update release, a build bump update, a patch release, a rollback major release, a rollback minor release, a rollback build bump update release, and a patch release. These are merely release type examples, and other release types may impact the storefront and/or jobs of the application.

TABLE 1

Deployment Impact

| | Release Type | Example | Disrupts Storefront | Disrupts Jobs |
|---|---|---|---|---|
| 1 | Major Migration Release | 20.1.3.70 → 20.2.0.250 | YES | YES |
| 2 | Minor Update Release | 20.1.2.50 → 20.1.3.20 | NO | YES |
| 3 | Build Bump Update Release | 20.1.2.50 → 20.1.2.51 | NO | YES |
| 4 | Patch Release | 20.1.2.50 → 20.1.2.51_A | NO | NO |
| 5 | | | | |
| 6 | Rollback Major Release | 20.2.0.250 → 20.1.3.70 | YES | YES |
| 7 | Rollback Minor Release | 20.1.3.20 → 20.1.2.50 | NO | YES |
| 8 | Rollback Build Bump Update Release | 20.1.2.51 → 20.1.2.50 | NO | YES |
| 9 | Rollback Patch Release | 20.1.2.51_A → 20.1.2.50 | NO | NO |

In the examples shown in Table 1 above, an increase of second set of digits of the release number (e.g., 20.1.3.70→20.2.0.250) may indicate the release type as a Major Migration Release, which may disrupt the storefront portion of the application for customers, and may disrupt pending jobs of the application in order to update the application. That is, a Major Migration Release may include performing DDL and/or DML updates that may not be performed while the application is running. A decrease of the second set of digits of the release (e.g., 20.2.0.250→20.1.3.70) may indicate a Rollback Major Release, which may disrupt the storefront and jobs during the rollback. The Rollback Major Release may include performing DDL and/or DML rollbacks that may not be performed while the application is running. An increase of third set of digits of the release number (e.g., the 20.1.2.50→20.1.3.20) may indicate the release type as a Minor Update Release. Such as release may not disrupt the storefront, but may disrupt jobs during the update. The Minor Update Release may not include any DDL and/or DML changes (i.e., only code changes may be included), but database migration may be run against a running application to update the version in the database. A decrease of the third set of digits of the release (e.g., 20.1.3.20→20.1.2.50) may indicate that the release type as a Rollback Minor Release, which may not disrupt the storefront, but may disrupt jobs during the rollback. The Rollback Minor Update Release include only code changes, and database migration may be run against a running application to rollback the version in the database.

An increase of the fourth series of digits of the release number (e.g., 20.1.2.50→20.1.2.51) may indicate the release type as a Build Bump Update Release. Such a release may not disrupt the storefront, but may disrupt jobs to perform the update. The Build Bump Release may have new binaries, but no database migration may be run. A decrease of the fourth series of digits of the release number (e.g., 20.1.2.51→20.1.2.50) may indicate the release type as a Rollback Build Bump Update Release, which may not disrupt the storefront, but may disrupt jobs to perform the update. The Rollback Build Bump Release may have new binaries, but no database migration may be run. An addition of letters or other indicators following the fourth set of digits of the release number (e.g., 20.1.2.50→20.1.2.51_A) may indicate the release type as a Patch Release. With this type of release, neither the storefront nor the jobs may be disrupted. A Patch Update may include new add-on binaries, and no database migration may be run. A removal of any letters or other indicators after the fourth set of digits of the release number (e.g., 20.1.2.51_A→20.1.2.50) may indicate the release type as a Rollback Patch Release, where neither the storefront nor the jobs may be disrupted during the rollback. A Rollback Patch Release may revert to previous add-on binaries, but no database migration may be run.

Figure 2:
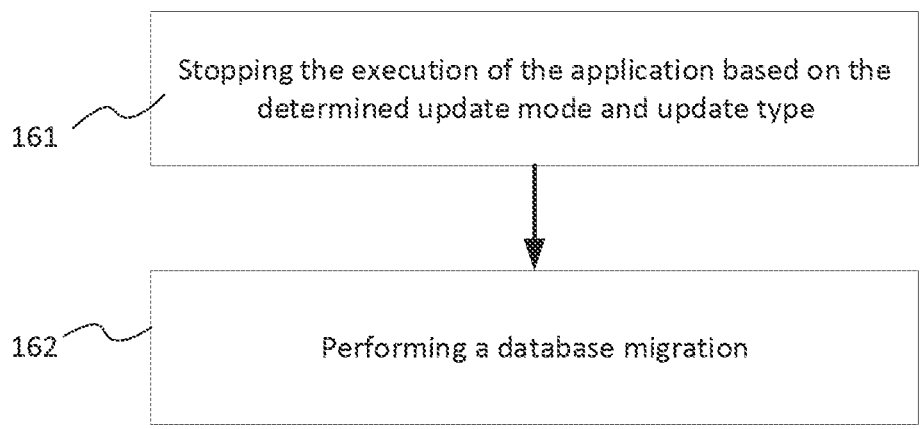
Figure 3:
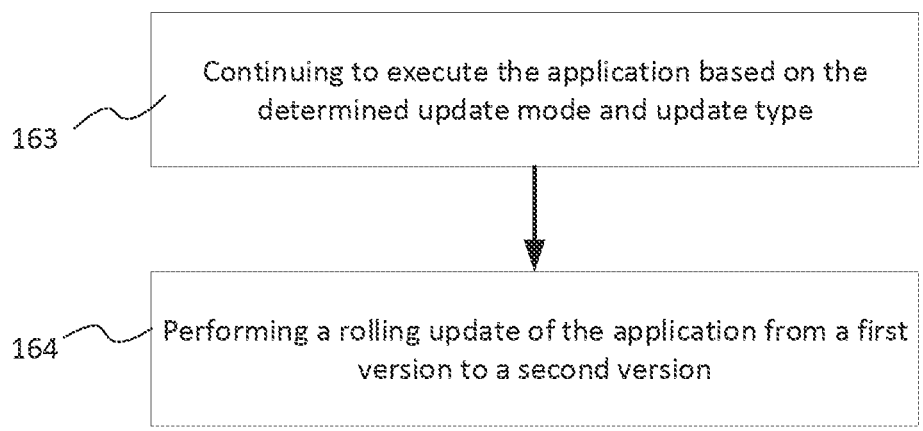

FIGS. 1-3 show an example method 100 of performing an application update according to implementations of the disclosed subject matter. At operation 110, an operator executed on a server that is separate from an application may determine whether to perform an update of the application. The server may be server 700 and/or server 800 shown in FIG. 5. For example, the server 700 may execute the operator, and the server 800 may be an application server to execute the application.

At operation 120, the operator may perform an upgrade precheck when it is determined that the update to the application is to be performed. The upgrade precheck of operation 120 may be performed by determining whether a database migration is to be performed as part of the update to the application at operation 130. The upgrade precheck of operation 120 may include that the operator receives, from the application, an update mode and an update type to determine the upgrade to the application at operation 140.

For example, the update mode may be a "not ready" mode, where an error has occurred and the deployment of the update is to be aborted. In another example, the update mode may be an "update" that is an allowable roll-forward release. In a further example, the update mode may be a "rollback" mode, where the update is an allowable roll-back release. In yet another example, the update mode may be a "patch" mode, where the update may be a patch release with no database migration. The example update modes are shown Table 2 below:

TABLE 2

Example Update Modes

| Update Mode | Description | Example |
| --- | --- | --- |
| NOT_READY | Some error occurred and the deployment should not happen. | 21.1.0.1 → 21.5.0.1 |
| UPDATE | Update is an allowable roll-forward release. | 21.1.0.1 → 21.2.0.1 |
| ROLLBACK | Update is an allowable roll-back release. | 21.2.0.1 → 21.1.0.1 |
| PATCH | Update is a patch release. No database migration job necessary. | 21.1.0.1 → 21.1.0.1_A |

The update type in operation 140 may be a "release" type, where a full migration major release that includes updates that may not be done while the application is being executed. The updates of the "release" type may include DDL and/or DML updates to the application. In another example, the update type may be a "hotfix code only" type, where the update includes code changes (i.e., without DDL and/or DML changes), and database migration may be executed against the application to update a version in database. In another example, the update type may be a "hotfix full migration" type, where the update of the application is between two versions of the application, and where a database migration is to be performed. In yet another example, the update type may be a "build version bump" type, where the update uses new binary files, and there is no database migration. In another example, the update type may be a "patch" type, where the update uses new add-on binaries, and there is no database migration. The example update types are shown in Table 3 below.

TABLE 3

Example Update Types

| Update Type | Description | Example |
| --- | --- | --- |
| RELEASE | Major release that requires a full migration release, requiring DDL/DML updates that cannot be done while the application is running. | 20.1.0.1 → 21.2.0.1 |
| HOTFIX_CODE_ONLY | Update does not include any DDL/DML changes, only code changes. Database migration will be run against a running application to update version in database. | 20.1.0.1 → 21.1.1.1 |
| HOTFIX_FULL_MIGRATION | Update is between two versions which generally do not require a database migration, but do in this case. Rare scenario used to fix database problems within a particular major release. | 20.1.0.1 → 21.1.1.1 |
| BUILD_VERSION_BUMP | Update only requires new binaries. No database migration will be run. | 20.1.0.1 → 21.1.0.2 |
| PATCH | Update only requires new add-on binaries. No database migration will be run. | 21.1.0.1 → 21.1.0.1_A |

As described above in connection with operations 120, 130, and 140, an upgrade precheck may be performed prior to deploying the updates to the application. In some implementations, the upgrade precheck may be triggered by an update to an instance of the application (e.g., a custom resource) which, when updated, may trigger a reconcile operation within the operator of the server (e.g., application server) that compares the version of the application instance to an underlying Kubernetes deployment. If the two versions are different, an upgrade to the application may be performed. As part of the application upgrade, the upgrade precheck (e.g., as described above and shown in operations 120, 130, and 140 of FIG. 1 may be performed).

In an example implementation, a precheck entry point may be provided to a docker container in a Kubernates implementation. A custom Kubernetes operator may execute the precheck as a Kubernetes job, which initiates a migration precheck process within the application's container and compares the target version of the application (e.g., the update version) with the current version to determine the type of upgrade to perform. An update mode and an update type may be logged to the container log, which may be parsed by the application's Kubernetes operator prior to rolling out a deployment of the update.

At operation 150, one or more application shutdown configuration parameters for the update may be provided from the operator to the application via an application program interface (API). The shutdown configuration parameters that are provided may be based on the received update mode and update type of the upgrade precheck of operations 120, 130, and 140.

Examples of the one or more application shutdown configuration parameters may include a timeout parameter which provides a timeout period for the shutdown of the application, and/or an abort parameter which stops jobs of the application, without continuation of the jobs at a later point in time. In another example, the shutdown configuration parameters may include a wait parameter, which allows the jobs of the application to be completed before the shutdown of the application. In yet another example, the shutdown configuration parameters may include a pause-continue parameter which stops jobs of the application at defined interrupt points such that the jobs continue later after the update. In another example, the shutdown configuration parameters may include a comment parameter which provides a comment for the shutdown to be logged in a job log. In a further example, the shutdown configuration parameters may include a user parameter which initiates the shutdown of the application, and the user parameter is logged in the job log. The application shutdown configuration parameters are discussed in detail below in connection with Tables 4-5.

Table 4 provides examples of shutdown modes of the application so that an update may be performed. Table 4 also provides examples of end user experiences (e.g., at a storefront of the application) when the application update is performed, and end user experiences for application jobs when the application update is performed. That is, the update mode and update type may be used to determine the determine how the application update is performed.

encing downtime at the application storefront, and the jobs of the application may be disrupted so that the application rollback may be performed. When the update mode is ROLLBACK and the update type is BUILD_VERSION_BUMP, the application may be aborted to perform the application rollback, with the end user experiencing no

TABLE 4

A Decision Matrix for Shutdown and End User Experience for an application update based on an UpdateMode and an Update Type.

| UpdateMode | UpdateType | Valid? | Shutdown Mode | End User Experience - Storefront | End User Experience - Jobs |
|---|---|---|---|---|---|
| NOT_READY | * | No | N/A | N/A | N/A |
| UPDATE | RELEASE | Yes | Abort | Downtime | Disruption |
| UPDATE | HOTFIX_CODE_ONLY | Yes | Abort | No Disruption | Disruption |
| UPDATE | HOTFIX_FULL_MIGRATION | Yes | Abort | Downtime | Disruption |
| UPDATE | BUILD_VERSION_BUMP | Yes | Abort | No Disruption | Disruption |
| UPDATE | PATCH | No | N/A | N/A | N/A |
| ROLLBACK | RELEASE | Yes | Abort | Downtime | Disruption |
| ROLLBACK | HOTFIX_CODE_ONLY | Yes | Abort | No Downtime | Disruption |
| ROLLBACK | HOTFIX_FULL_MIGRATION | Yes | Abort | Downtime | Disruption |
| ROLLBACK | BUILD_VERSION_BUMP | Yes | Abort | No Disruption | Disruption |
| ROLLBACK | PATCH | No | N/A | N/A | N/A |
| PATCH | RELEASE | No | N/A | N/A | N/A |
| PATCH | HOTFIX_CODE_ONLY | No | N/A | N/A | N/A |
| PATCH | HOTFIX_FULL_MIGRATION | No | N/A | N/A | N/A |
| PATCH | BUILD_VERSION_BUMP | No | N/A | N/A | N/A |
| PATCH | PATCH | Yes | Graceful Termination | No Disruption | No Disruption |

When the update mode is NOT_READY, no application update is performed, as the update is not valid at this time. When the update mode is UPDATE and the update type is RELEASE, the application may be aborted to perform the update, with the end user experiencing downtime and the jobs of the application being disrupted so that the update may be performed. When the update mode is UPDATE and the update type is HOTFIX_CODE_ONLY, the application may be aborted to perform the update, with the end user experiencing no disruption, but the jobs of the application may be disrupted when the application update is performed. When the update mode is UPDATE and the update type is HOTFIX_FULL_MIGRATION, the end user may experience downtime of the application storefront, and the jobs of the application may be disrupted when the application update is performed. When the update mode is UPDATE and the update type is BUILD_VERSION_BUMP, the end user may experience no disruption, but the jobs of the application may be disrupted to perform the application update. When the update mode is UPDATE and the update type is PATCH, the application may be patched, rather than perform an application update.

When the update mode is ROLLBACK (i.e., to revert to an earlier version of the application) and the update type is RELEASE, the application may be aborted to perform the update, with the end user experiencing downtime at the application storefront, and the jobs of the application may be disrupted so that the application rollback may be performed. When the update mode is ROLLBACK and the update type is HOTFIX_CODE_ONLY, the application may be aborted to perform the application rollback, with the end user experiencing no downtime at the application storefront, and the jobs of the application may be disrupted so that the application rollback may be performed. When the update mode is ROLLBACK and the update type is HOTFIX_FULL_MIGRATION, the application may be aborted to perform the application rollback, with the end user experidisruption at the application storefront, and the jobs of the application may be disrupted so that the application rollback may be performed. When the update mode is ROLLBACK and the update type is PATCH, the application may be patched, rather than perform a full application rollback.

When the update mode is PATCH and the update type is RELEASE, HOTFIX_CODE_ONLY, HOTFIX_FULL_MIGRATION, or BUILD_VERSION_BUMP, the application is patched, rather than performing a full application update or rollback. When the update mode is PATCH and the update type is PATCH, the application gracefully terminates to perform the patch, the end user may not experience disruption at the storefront, and there may be no disruption of the jobs of the application for the application patch.

Kubernetes natively supports shutdown hooks to allow for custom script execution to support graceful shutdowns. However, such shutdown hooks are statically configured, where any change to them results in a rolling restart to the deployment so that all pods can pick up the new configuration. This presents the problem of wanting to change a shutdown configuration, but the application must be shut down in order to change it. Implementations of the disclosed subject matter addresses this by including a shutdown API (application program interface) on the application. The API allows for passing configuration parameters to the application which direct the application how it should shut down. The application may be executed with multiple pods and/or containers, one or more of which may be shut down independently. In implementations of the disclosed subject matter, the configuration may be synchronized across one or more nodes. Each pod may be restarted so that the shutdown configuration only lasts for a single restart cycle. This API may be called by the operator (e.g., a Kubernetes operator) or spawned as a separate Kubernetes job.

Table 5 below provides example application shutdown configuration parameters that may be provided to the application via the API.

TABLE 5

Shutdown Configuration Parameters

| Argument | Values | Optional | Default | Description |
|---|---|---|---|---|
| timeout | Integer | TRUE | environment specific | The timeout for the shutdown in seconds. Default can be configured via default environment specific default properties. |
| strategy | One of: | TRUE | environment specific | The interruption strategy for jobs. Default can be configured via default environment specific default properties. |
|  | abort |  |  | abort = stop jobs in a clean manner, without continuation later, timeout parameter not relevant |
|  | wait |  |  | wait = wait until jobs are finished |
|  | pause-continue |  |  | pause-continue = stop jobs in a clean manner at defined interruption points, allow continuation later (by another application server of the cluster, or when the shutdown application server is started again if there is only one application server). |
| comment | String | TRUE | not present | A comment for the shutdown (free text, e.g. to inform about the shutdown reason, like migration, deployment). This is logged in the job log file and is shown in the job history UI (user interface) |
| user | String | TRUE | not present | The user that initiated the shutdown (free text). This is logged in the job log file. |

The timeout shutdown configuration parameter may be an argument that includes integer values. The timeout may be environment specific, and may be for a shutdown in a predetermined number of seconds. A default value may be configured based on a particular environment.

The strategy shutdown configuration parameter may include values that may be one of abort, wait, or pause-continue. The strategy shutdown may be an interruption strategy for jobs of the application that may be pending or executing. With the abort parameter, jobs of the application may be stopped in a clean manner, without continuation at a later time. When the wait parameter is used, it may allow for the jobs to be completed before shutting the application down. When the pause-continue parameter is used, the jobs may be stopped in a clean manner at predetermined interruption points, and may allow the jobs to be completed at a later time. The comment parameter may be a string value, and may be text to inform about the reason for the shutdown. The comment may be logged in a job log file, and may be shown in the job history user interface. The user parameter may be a string value, and may be text to indicate that the user initiated the shutdown. The text may be logged in the job log file.

At operation 160, the operator may deploy the update to the application based on the determined update mode and update type. Deploying the update may include instructing the application to shutdown and provide a predetermined period of time for jobs of the application to complete before the application is shut down. In some implementations, the deploying the update at operation 160 may include instructing the application to abort.

In some implementations, an end-user (e.g., an end-user of the application at computer 500 shown in FIG. 5) may experience application downtime when the application update is deployed at operation 160. Alternatively, the end-user may experience no application disruption based on the received update mode and the update type.

In some implementations, the deploying the update at operation 160 may impact jobs executed by the application. For example, jobs of the application may experience disruption or no disruption based on the received update mode and the update type.

FIGS. 2-3 show optional operations that may be performed as part of operation 160. As shown in FIG. 2, the execution of the application may be stopped based on the determined update mode and update type at operation 161. A database migration may be performed at operation 162. As shown in FIG. 3, operation 160 may include continuing to execute the application based on the determined update mode and update type at operation 163. A rolling update of the application from a first version to a second version may be performed at operation 164.

FIGS. 4A-4D show an example method 400 of a Kubernetes-based implementation of the disclosed subject matter. At operation 401 shown in FIG. 4A, the release train definition (RTD) may be updated by the server (e.g., server 700 and/or server 800 shown in FIG. 5). The RTD may be a manifest that defines a desired state of all application versions that may be implemented across a cluster of a computing network. At operation 402, an application instance may be updated by the server, and at operation 403 the application server may be updated. That is, operation 402 may update a particular instance of an application, such as when an application server may be executing a plurality of instances of the application. At operation 403, the application server may be updated so that new application instances that are created include the updates.

At operation 404, the server may determine whether an application instance to be upgraded or rolled back is part of a primary instance group. A primary instance group may be a cluster of instances of applications. If the application instance is not part of the primary instance group, the server may set abort shutdown parameters at operation 405. For example, the shutdown API described above in connection with operation 150 of FIG. 1 may be called by the server with an abort strategy (e.g., abort, wait, pause-continue as shown in Table 5 above) for the application, and may provide the parameters for the selected abort strategy. At operation 406, the server may set the replica count in Kubernetes to zero (i.e., scale to zero) to eliminate replicants. When operation 406 has been completed, or if the application instance is part of the primary instance group at operation 404, the server may perform an update precheck at operation 407, which may be similar to operations 120, 130, and 140 described above in connection with FIG. 1.

Figure 4A:
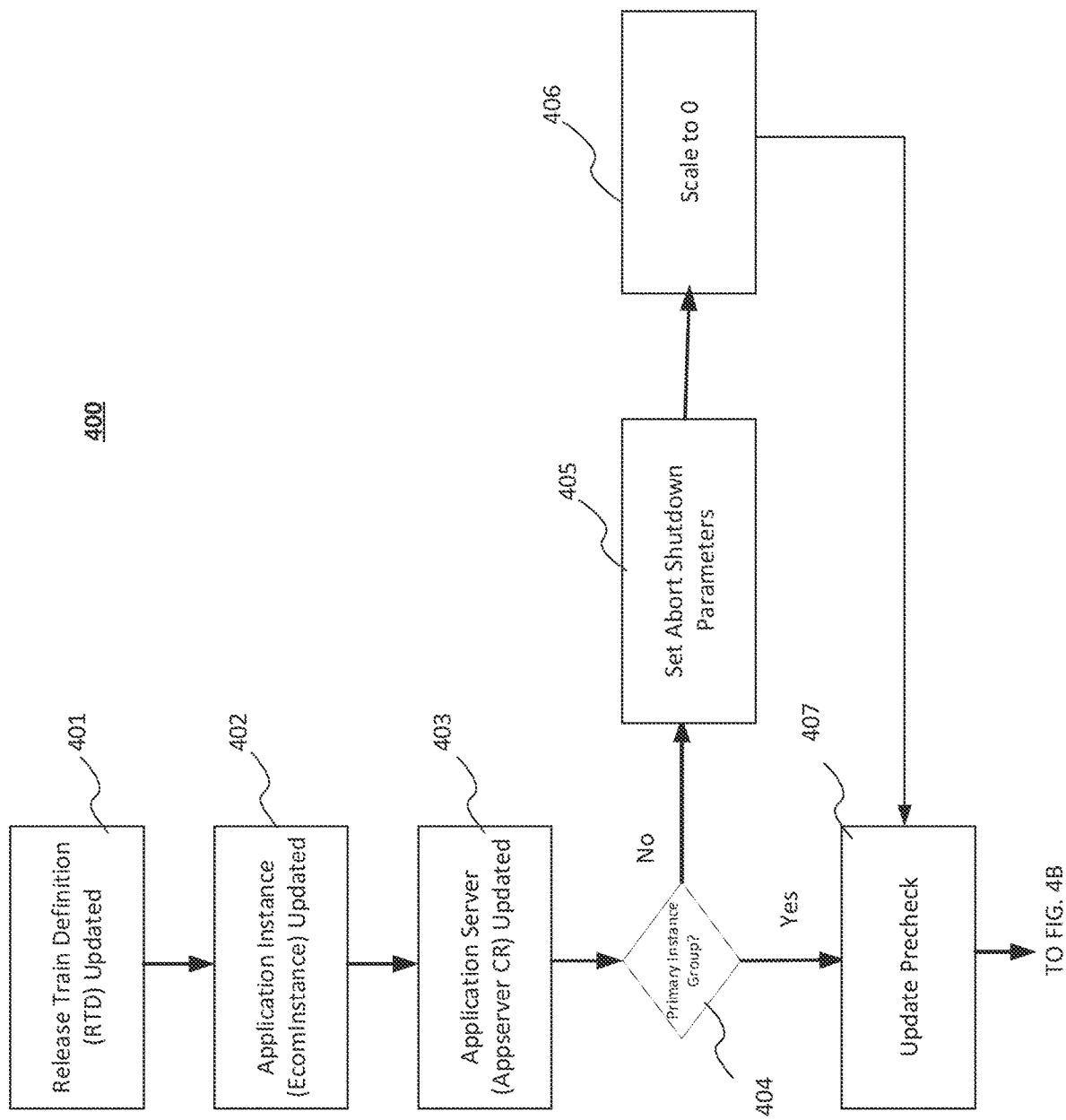
Figure 4B:
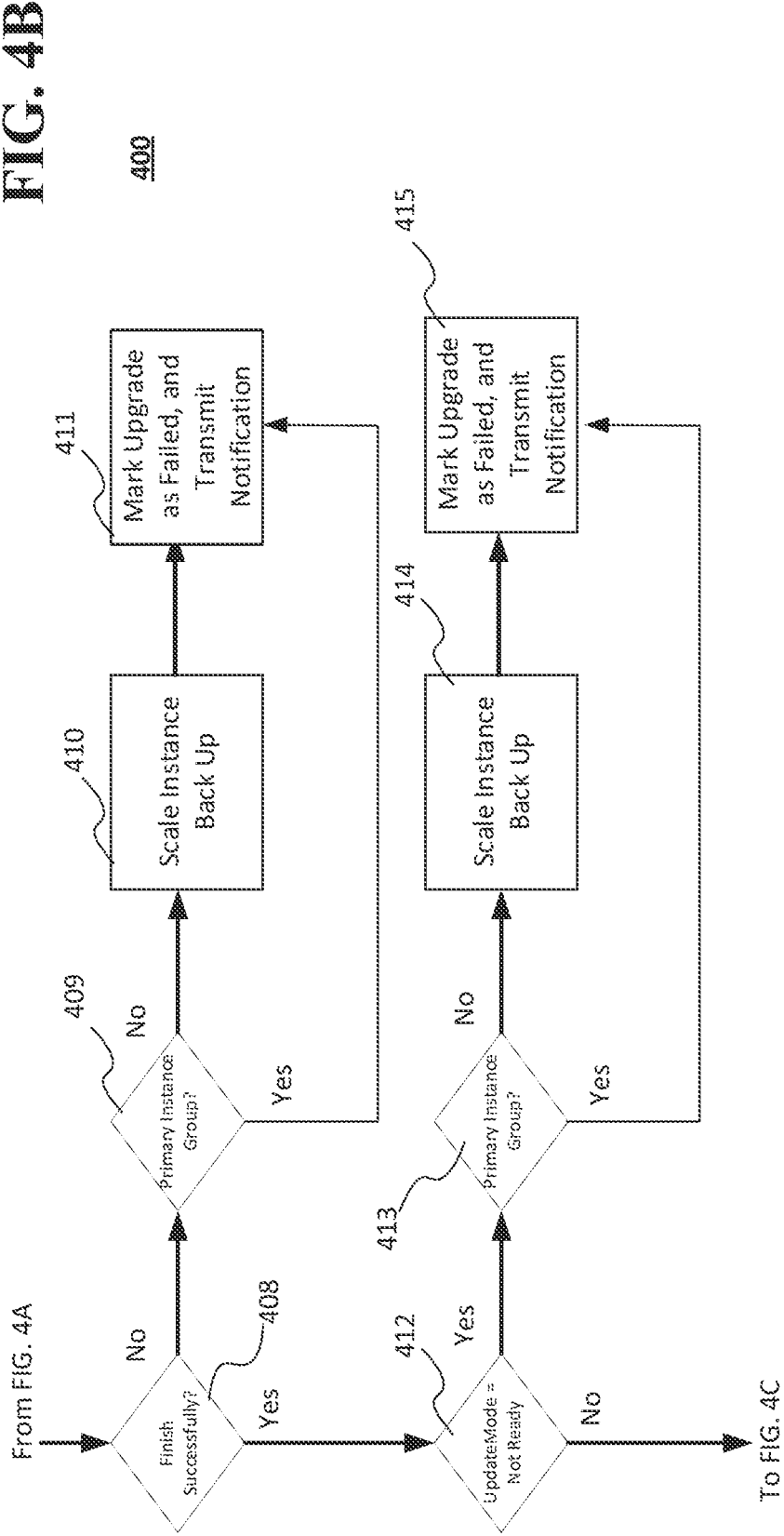

As shown in FIG. 4B, the server may determine whether the update precheck has finished successfully at operation 408 as shown in FIG. 4. If the upgrade precheck has not finished, the server may determine whether the application instance is part of the primary instance group at operation 409. If the application instance is not part of the primary instance group, the server may scale the instance of the application back up at operation 410. Scaling the instance of the application back up may make the application instance operation to end users. The server may mark the upgrade as failed at operation 411, and may transmit a notification regarding the upgrade failure. That is, the application may be scaled back up to be operational, but may not have been updated. Operation 411 may also be executed when the server determines at operation 409 that the application instance is part of the primary instance group.

When the server determines at operation 408 that the update precheck has been finished successfully, operation 412 may determine whether the update mode is a "not ready" mode (see, e.g., Table 2 above). When the update mode is a "not ready mode", the server may determine whether the application instance is part of the primary instance group at operation 413. When the application is not part of the primary instance group, the server may scale the application instance back up at operation 414, and may mark the upgrade as failed at operation 415. A notification regarding the failure may be transmitted at operation 415. When the server determined that the application instance is part of the primary instance group at operation 413, the operation 415 as previously described may be performed.

Figure 4C:
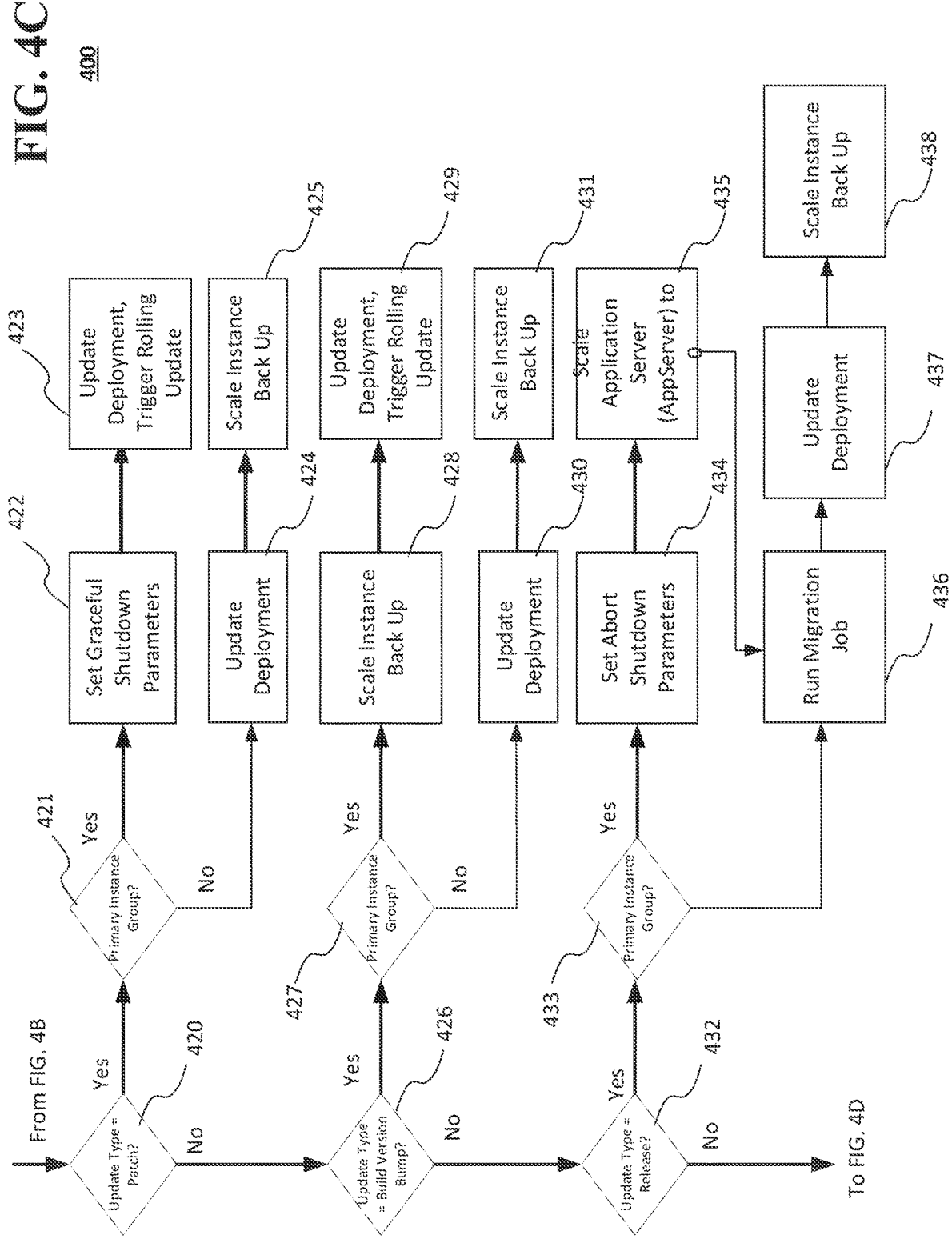

When the server determines at operation 412 that the update mode is not the "not ready" mode, the server may determine whether the update type is "patch" (see, e.g., Table 3 above) as shown in FIG. 4C. When the upgrade type is "patch," the server may determine whether the application instance is part of the primary instance group at operation 421. When the application instance is determined to be part of the primary instance group, the server may set graceful shutdown parameters for the application at operation 422 (e.g., wait or pause-continue as shown in Table 5). The server may update the deployment of the application at operation 423, which may trigger a rolling update of the application. If the server determines at operation 421 that the application instance is not part of the primary instance group at operation 421, the server may update the deployment at operation 424, and may scale the instance of the application back up at operation 425.

When the server determines at operation 420 that the update type is not "patch", the server may determine at operation 426 whether the update type is "build version bump" (see, e.g., Table 4). When the update type is "build version bump," the server may determine whether the application instance is part of the primary instance group at operation 427. When the application instance is part of the primary instance group, the server may scale the application instance back up at operation 428, and may update the application deployment and trigger a rolling update at operation 429. When the server determines that the application instance is not part of the primary instance group at operation 427, the server may update the application deployment at operation 430, and may scale the application instance back up at operation 431.

When the server determines that the update type is not "build version bump" at operation 426, the server may determine whether update type is "release" (see, e.g., Tables 3-4) at operation 432. When the server determines that the update type is "release," the server may determine whether the application instance is part of the primary instance group at operation 433. When the application instance is part of the primary instance group, the server may set the abort shutdown parameters at operation 434 (see, e.g., Table 5). The application server may be scaled to 0 at operation 435. That is, the replica count may be set to 0, which may kill any replicants. At operation 436, the server may run a migration job to migrate any data, jobs, and/or tasks of the application. At operation 437, the server may update the deployment of the application. At operation 438, the server may scale the application instance back up. When the server determines that the application instance is part of the primary instance group at operation 433, the operations 436, 437, and 438 may be performed as described above.

When the server determines at operation 432 that the update type is not "release," the server may determine whether the update type is "hot fix code only" (see, e.g., Tables 3-4) at operation 439 as shown in FIG. 4D. When the update type is "hot fix code only," the server may determine whether the update mode is "rollback" (see, e.g., Table 4) at operation 440. When the update mode is not "rollback", the server may run a migration job at operation 441. After the running of the migration job or when the server determines that the update mode is "rollback", the server may determine whether the application instance is part of the primary instance group at operation 442. When the application instance is part of the primary instance group, the server may set abort shutdown parameters (e.g., abort, wait, pause-continue shown in Table 5) at operation 443. At operation 444, the server may update the application deployment, and may trigger a rolling update. If the server determines that the application instance is not part of the primary instance group at operation 442, the server may update the application deployment at operation 445, and may scale the application instance back up at operation 446.

When the server determines that the update type is not "hot fix code only" at operation 439, the server may determine whether the update type is "hot fix full migration" at operation 447. When the server determines that the update type is "hot fix full migration," the server may determine whether the application instance is part of the primary instance group at operation 448. When the application instance is part of the primary instance group, the server may set abort shutdown parameters (see, e.g., Table 5) at operation 449. The application server may be scaled to 0 at operation 450. If the server determines that the application instance is not part of the primary instance group at operation 448, the server may run a migration job at operation 451. The server may update the application deployment at operation 452, and may scale the application instance back up at operation 453.

When the server determines that the update type is not "hot fix full migration" at operation 447, the server may determine whether the application instance is part of the primary instance group at operation 454. When the application instance is not part of the primary instance group, the server may scale the application instance back up at operation 455, and may mark the upgrade as failed at operation 456. The server may transmit a notification at operation 456 that the upgrade has failed. When the server determines at operation 454 that the application instance is not part of the primary instance group, the server may perform operation 456 as described above.

Implementations of the presently disclosed subject matter may be implemented in and used with a variety of component and network architectures. FIG. 5 is an example computer 500 which may display a storefront and/or website generated by an application instance that is executed server 700 and/or 800 based on the example methods shown in FIGS. 1-4D and described above.

As shown in FIG. 5, the computer 500 may communicate with a server 700 (e.g., a server, cloud server, database, cluster, application server, neural network system, or the like) via a wired and/or wireless communications network 600. The server 700 may be a plurality of servers, cloud servers, databases, clusters, application servers, neural network systems, or the like. The server 700 may include a processor 705, which may be a hardware processor, a microprocessor, an integrated circuit, a field programmable gate array, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 900, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to server 800, which may be one or more servers, cloud servers, databases, clusters, application servers, neural network systems, or the like. The server 800 may include a processor 805, which may be a hardware processor, a microprocessor, an integrated circuit, a field programmable gate array, or the like Server 800 may include storage 810, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 and/or server 800 may execute one or more application instances. The server 700 and/or 800 may use data from the database 900 in providing a storefront and/or website to an end user of the computer 500.

The storage 710 of the server 700, the storage 810 of the server 800, and/or the database 900, may store data for one or more instances of the application, updates for the application, and the like. Further, if the storage 710, storage 910, and/or database 800 is a multitenant system, the storage 710, storage 910, and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "performing," "receiving," "providing," "deploying," "stopping," "continuing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   determining, at an operator executed on a server, whether to perform an update of an application;
   performing, at the operator, an update precheck in response to determining that the update to the application is to be performed by:
      determining whether a database migration is to be performed as part of the update to the application; and
      receiving, from the application at the operator, an update mode and an update type of the update precheck to determine the update to the application, wherein the update type determines whether the application is configured to be updated while the application is being executed; and
   providing, from the operator to the application via an application program interface (API), one or more application shutdown configuration parameters for the update based on the received update mode and update type of the update precheck, wherein the one or more application shutdown configuration parameters includes a parameter which stops jobs of the application at defined interrupt points such that the jobs continue later after the update; and
   deploying, at the operator, the update to the application based on the received update mode and update type.

2. The method of claim 1, wherein the update mode is at least one selected from the group consisting of: a not ready mode, wherein an error occurred and the deployment of the update is to be aborted; an allowable roll-forward release; a rollback mode, wherein the update is an allowable roll-back release; and a patch mode, wherein the update is a patch release with no database migration.

3. The method of claim 1, wherein the update type is at least one selected from the group consisting of: a release type, wherein a full migration major release includes updates that cannot be done while the application is being executed; hotfix code only type, wherein the update includes code changes, and database migration is executed against the application to update a version in database; a hotfix full migration type, wherein the update of the application is between two versions of the application, and wherein a database migration is performed; a build version bump type, wherein the update uses new binary files, and there is no database migration; and a patch type, wherein the update uses new add-on binaries, and there is no database migration.

4. The method of claim 1, wherein the deploying the update comprises:
   stopping execution of the application based on the received update mode and update type; and
   performing a database migration.

5. The method of claim 1, wherein the deploying the update comprises:
   continuing to execute the application based on the received update mode and update type; and performing a rolling update of the application from a first version to a second version.

6. The method of claim 1, wherein the deploying the update comprises instructing the application to shutdown and provide a predetermined period of time for jobs of the application to complete before the application is shut down.

7. The method of claim 1, wherein the deploying the update comprises instructing the application to abort.

8. The method of claim 1, wherein the deploying the update comprises an end-user experience of the application of a least one selected from the group consisting of: application downtime, and no application disruption based on the received update mode and the update type.

9. The method of claim 1, wherein the deploying the update comprises jobs of the application to experience at least one from the group consisting of: disruption, and no disruption based on the received update mode and the update type.

10. The method of claim 1, wherein the one or more application shutdown configuration parameters are selected from the group consisting of: a timeout parameter which provides a timeout period for the shutdown of the application; an abort parameter which stops jobs of the application, without continuation of the jobs later; a wait parameter, which allows the jobs of the application to be completed before the shutdown of the application; a comment parameter which provides a comment for the shutdown to be logged in a job log; and a user parameter which initiates the shutdown of the application, and the user parameter is logged in the job log.

11. A system comprising:
a server including a processor, wherein the server is communicatively coupled to a storage device to:
determine, at an operator executed on the server, whether to perform an update of the application;
perform, at the operator, an update precheck in response to determining that the update to the application is to be performed by:
determining whether a database migration is to be performed as part of the update to the application; and
receiving, from the application at the operator, an update mode and an update type of the update precheck to determine the update to the application, wherein the update type determines whether the application is configured to be updated while the application is being executed; and
provide, from the operator to the application via an application program interface (API), one or more application shutdown configuration parameters for the update based on the received update mode and update type of the update precheck, wherein the one or more application shutdown configuration parameters includes a parameter which stops jobs of the application at defined interrupt points such that the jobs continue later after the update; and
deploy, at the operator, the update to the application based on the received update mode and update type.

12. The system of claim 11, wherein the update mode is at least one selected from the group consisting of: a not ready mode, wherein an error occurred and the deployment of the update is to be aborted; an allowable roll-forward release; a rollback mode, wherein the update is an allowable roll-back release; and a patch mode, wherein the update is a patch release with no database migration.

13. The system of claim 11, wherein the update type is at least one selected from the group consisting of: a release type, wherein a full migration major release includes updates that cannot be done while the application is being executed; hotfix code only type, wherein the update includes code changes, and database migration is executed against the application to update a version in database; a hotfix full migration type, wherein the update of the application is between two versions of the application, and wherein a database migration is performed; a build version bump type, wherein the update uses new binary files, and there is no database migration; and a patch type, wherein the update uses new add-on binaries, and there is no database migration.

14. The system of claim 11, wherein the server deploys the update by stopping execution of the application based on the received update mode and update type, and by performing a database migration.

15. The system of claim 11, wherein the server deploys the update by continuing to execute the application based on the received update mode and update type, and by performing a rolling update of the application from a first version to a second version.

16. The system of claim 11, wherein the server deploys the update by instructing the application to shutdown and by providing a predetermined period of time for jobs of the application to complete before the application is shut down.

17. The system of claim 11, wherein the server deploys the update by instructing the application to abort.

18. The system of claim 11, wherein the server deploys the update by an end-user experience of the application of a least one selected from the group consisting of: application downtime, and no application disruption based on the received update mode and the update type.

19. The system of claim 11, wherein when the server deploys the update, jobs of the application experience at least one from the group consisting of: disruption, and no disruption based on the received update mode and the update type.

20. The system of claim 11, wherein the one or more application shutdown configuration parameters are selected from the group consisting of: a timeout parameter which provides a timeout period for the shutdown of the application; an abort parameter which stops jobs of the application, without continuation of the jobs later; a wait parameter, which allows the jobs of the application to be completed before the shutdown of the application; a comment parameter which provides a comment for the shutdown to be logged in a job log; and a user parameter which initiates the shutdown of the application, and the user parameter is logged in the job log.

* * * * *